United States Patent
Gutle et al.

(10) Patent No.: US 10,414,031 B2
(45) Date of Patent: Sep. 17, 2019

(54) MOUNTING DEVICE AND METHOD FOR THE COUNTERFORCE-FREE MOUNTING OF A PRESSURE PLATE ASSEMBLY ON A COUNTERPRESSURE PLATE, AND METHOD FOR COUNTERFORCE-FREE DISMOUNTING

(71) Applicant: Schaeffler Technologies AG & Co. KG, Herzogenaurach (DE)

(72) Inventors: Martin Gutle, Offenburg (DE); Tanja Kubicek, Rastatt (DE); Sebastien Muller, Mundolsheim (FR); Volker Hornberger, Pfalzgrafenweiler (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 636 days.

(21) Appl. No.: 14/779,151

(22) PCT Filed: Apr. 3, 2014

(86) PCT No.: PCT/EP2014/056698
§ 371 (c)(1),
(2) Date: Sep. 22, 2015

(87) PCT Pub. No.: WO2014/170133
PCT Pub. Date: Oct. 23, 2014

(65) Prior Publication Data
US 2016/0052113 A1    Feb. 25, 2016

(30) Foreign Application Priority Data
Apr. 17, 2013  (DE) .......................... 10 2013 206 891

(51) Int. Cl.
*B25B 27/00*    (2006.01)
*F16D 13/75*    (2006.01)
(Continued)

(52) U.S. Cl.
CPC ........ *B25B 27/0064* (2013.01); *F16D 13/757* (2013.01); *F16D 13/70* (2013.01); *F16D 19/00* (2013.01)

(58) Field of Classification Search
CPC ... B25B 27/0064; F16D 13/757; F16D 13/70; F16D 19/00
See application file for complete search history.

(56) References Cited

U.S. PATENT DOCUMENTS

| 2,583,621 A * | 1/1952 | Zeidler ................... F16D 13/71 |
| | | 192/105 C |
| 5,887,328 A | 3/1999 | Rydin et al. |
| 2008/0276768 A1 | 11/2008 | Brock et al. |

FOREIGN PATENT DOCUMENTS

| CN | 88201434 | 12/1988 |
| CN | 2486420 | 4/2002 |

(Continued)

OTHER PUBLICATIONS

English Translation DE29915947 by Espace, printed Aug. 29, 2018.*

*Primary Examiner* — John C Hong
(74) *Attorney, Agent, or Firm* — Volpe and Koenig, P.C.

(57) ABSTRACT

A mounting device (11) for the counterforce-free mounting of a pressure plate assembly (1) on a counterpressure plate, the mounting plate having at least one release element (12) which can be displaced in an axial direction (A) relative to the pressure plate assembly and which is designed to exert an axial force on spring washer tongues (10) of the pressure plate assembly (1) in order to release the pressure plate assembly (1), which is normally engaged, and having at least one hook element (18) that is designed to engage behind a coupling lid (2) of the pressure plate assembly (1) in order to hold the mounting device (11) in place relative to the pressure plate assembly (1) at least in an axial direction (Continued)

when the release element (12) exerts axial force on the spring washer tongues (10) of the pressure plate assembly (1). A corresponding method for the counterforce-free mounting of the pressure plate assembly (1) and a corresponding method for the counterforce-free dismounting of the pressure plate assembly (1) are also provided.

13 Claims, 3 Drawing Sheets

(51) Int. Cl.
      *F16D 13/70*    (2006.01)
      *F16D 19/00*    (2006.01)

(56) References Cited

FOREIGN PATENT DOCUMENTS

| | | |
|---|---|---|
| DE | 29915947 | 12/1999 |
| DE | 202010011709 | 12/2010 |

* cited by examiner

MOUNTING DEVICE AND METHOD FOR THE COUNTERFORCE-FREE MOUNTING OF A PRESSURE PLATE ASSEMBLY ON A COUNTERPRESSURE PLATE, AND METHOD FOR COUNTERFORCE-FREE DISMOUNTING

BACKGROUND

The present invention relates to a mounting device and a method for the counterforce-free mounting of a pressure plate assembly to a counterpressure plate. Further, the present invention relates to a method for the counterforce-free dismounting of a pressure plate assembly from a counterpressure plate.

A mounting device is known from DE 20 2010 011 709 U1 for the counterforce-free mounting of a pressure plate assembly to a counterpressure plate. The mounting device comprises several adjustment bodies, by which the mounting device can be connected via screws to the counterpressure plate at the side facing the motor. In order to allow adjusting the adjustment bodies to different clutch types and arrangements of holes, the adjustment bodies are provided, on the one hand, on two different bridges, which can be rotated in reference to each other in the circumferential direction, and on the other hand they are supported on these bridges respectively in oblong holes, allowing their positioning in reference to each other to be adjusted in a radial direction.

It is considered disadvantageous that this mounting device has a relatively large design, due to the two bridges. This can aggravate the handling thereof.

SUMMARY

Accordingly, the objective of the present invention is to provide a mounting device and a method for the counterforce-free mounting of a pressure plate assembly to a counterpressure plate, as well as a respective method for the counterpressure-free dismounting, which allows easy handling.

According to the invention this objective is attained in an assembly device for the counterpressure-free mounting of a pressure plate assembly to a counterpressure plate with at least one release element, which can be displaced in the axial direction in reference to the pressure plate assembly, which is embodied to impinge spring washer tongues of the pressure plate assembly with an axial force in order to release the normally engaged pressure plate assembly and with at least one hook element, which is embodied to engage behind a coupling lid of the pressure plate assembly in order to hold the mounting device in a stationary position, at least in the axial direction in reference to the pressure plate assembly, when the release element impinges the spring washer tongues of the pressure plate assembly with the axial force.

With the use of the hook element, which is embodied to engage behind the coupling lid of the pressure plate assembly, the mounting device can rest directly on a coupling lid. It is no longer necessary to support the mounting device on the counterpressure plate, allowing on the one hand to reduce the size of the mounting device, particularly in the circumferential direction, but also in the axial direction, and on the other hand to improve the handling for the user of the mounting device.

Preferred exemplary embodiments of the present invention are shown in the dependent claims.

Preferably several hook elements are arranged in the circumferential direction of the mounting device, in particular preferably evenly distributed at a distance from each other. This allows, on the one hand, a homogenous introduction of force into the coupling lid, while on the other hand the amounting device can be centered on the coupling lid in a simple fashion. The hook elements are embodied to engage behind the coupling lid, coming from a central opening of the coupling lid. The engagement from behind occurs therefore in a radial fashion, coming from the inside, allowing the reduction of the exterior dimensions of the mounting device, particularly in the circumferential direction of said mounting device.

The mounting device preferably comprises a base element, which is embodied to contact the coupling lid outside the pressure plate assembly, and with the release element being arranged thereon in a displaceable fashion in the axial direction of the mounting device. Preferably the base element is essentially embodied in an annular fashion. The release element may be provided directly or indirectly on the base element. In particular, it is advantageous that the release element is provided at a spindle unit and/or as a part of a spindle unit, which is supported in a spindle holder at the side facing the base element. When the spindle unit is rotated the spindle unit converts the rotary motion into an axial motion, thus moving the release element in the axial direction. However, it is also possible to move the release element in the axial direction in a different manner, for example using a hydraulic cylinder.

In particular, it is advantageous when the base element and the hook element are embodied to hold the mounting device on the coupling lid, fixed in the axial direction. Here, the coupling lid is clamped in the axial direction between the base element on the one side, particularly at the top, and the hook element on the other side, particularly at the bottom. This way any jamming or slipping of the mounting device is prevented, even when the release element has not yet contacted the spring washer tongues of the pressure plate assembly and/or engages the spring washer tongues of the pressure plate assembly.

According to another preferred exemplary embodiment the base element comprises a central opening, with its diameter preferably being equivalent essentially to the diameter of the central opening of the coupling lid. The hook element is supported on the base element in the proximity of the central opening in a tippable and/or in the circumferential direction rotational fashion, in order to engage behind said coupling lid. This allows a particularly compact and easily operable design of the mounting device.

In particular, it is advantageous when the hook element is embodied to penetrate the pressure plate assembly between two adjacent flat spring tongues and to engage behind the coupling lid. This requires that the hook elements are embodied in a narrow fashion, particularly in the circumferential direction, for example by way of being formed as sheet metal parts.

According to another preferred exemplary embodiment the hook element forms a part of a bayonet lock and is embodied to form a bayonet connection with the coupling lid representing the other part. Both of the above-mentioned options represent particularly user-friendly options to connect the mounting device to the pressure plate assembly.

Preferably the release element comprises at its end section a pressure element, which is embodied to contact the spring washer tongues, coming from the coupling lid, in order to release the normally engaged, compressed pressure plate assembly. The pressure element may for example be embodied as a disk or as the end section of the above-mentioned spindle unit.

It is also advantageous when the release element in its end section comprises a tensile element, which is embodied in a hook-like fashion, in order to engage behind the spring washer tongues, coming from the pressure plate of the pressure plate assembly, in order to release the normally engaged pressure plate assembly subject to tensile stress. For example, the tensile element may exhibit hook-like sections, which penetrate in the circumferential direction between adjacent spring washer tongues, coming from the coupling lid. When these hook-like sections have reached the rear of the spring washer tongues, i.e. the side of the spring washer tongues facing the pressure plate, the tensile element is slightly rotated in the circumferential direction so that the hook-like sections contact the rear sides of the spring washer tongues in order to engage them from behind.

In order to allow using the mounting device both for normally engaged, compressed pressure plate assemblies as well as for normally engaged, pressure plate assemblies subjected to tensile stress it is advantageous when various release elements can be mounted, for example when the above-mentioned pressure element can be exchanged for the above-mentioned tensile element and vice versa. It is also possible to combine the functions of the pressure element and the tensile element in a single release element.

Furthermore it is advantageous when the mounting device, preferably the base element of the mounting device, comprises at least one rotation lock, which can be made to engage the coupling lid in order to prevent any rotation of the mounting device in the circumferential direction. This rotation lock is particularly advantageous when the mounting device comprises a spindle unit, which converts a rotary motion into an axial motion of the release element, because particularly when the mounting device has not been sufficiently stressed, i.e. the release element has not begun acting upon the spring washer tongue, it is possible for the mounting device to be entrained.

According to another preferred exemplary embodiment the mounting device, preferably the base element of the mounting device, comprises at least one clamping device, which acts upon the hook element or elements in order to prevent the hook element or elements from popping out during the release process. It may be possible to form this clamping device, for example as a tensile ring, with it being possible to reduce its diameter, which acts upon the free end of the hook elements, however it may also be formed by individual bolts, which in the radial direction can be screwed in, with each of them acting upon a free end of a hook element. Other embodiments of the clamping device are also possible, for example form-fitting clamping devices, in which engagements from behind prevent the hook element or elements from popping out.

The above-mentioned objective is further attained according to the invention in a method for the counterforce-free mounting of a pressure plate assembly to the counterpressure plate using a mounting device according to at least one of the previous exemplary embodiments, with the mounting device being placed via its base element onto the top of the coupling lid of the pressure plate assembly, the hook element or elements is/are rotated and/or tilted in order to engage the rear of the clutch disk from behind, so that the mounting device rests on the coupling lid, fixed in the axial direction, the release element is displaced in the axial direction in reference to the pressure plate assembly in order to impinge the spring washer tongues with an axial force and release the normally engaged pressure plate assembly, and the pressure plate assembly is connected fixed to the counterpressure plate.

The above-mentioned objective is further attained according to the invention in a method for the counterpressure-free dismounting of a pressure plate assembly from a counterpressure plate using a mounting device according to at least one of the previous exemplary embodiments, with the mounting device being placed via its base element onto the top of the coupling lid of the pressure plate assembly, the hook element or elements is/are rotated and/or tilted in order to engage behind the rear of the coupling lid, so that the mounting device rests in the axial direction tightly on the coupling lid, the release element is displaced in reference to the pressure plate assembly in the axial direction in order to impinge the spring washer tongues with an axial force and release the normally engaged pressure plate assembly, and the pressure plate assembly is released from the counterpressure plate.

BRIEF DESCRIPTION OF THE DRAWINGS

In the following, the present invention is explained in greater detail based on preferred exemplary embodiments in connection with the corresponding figures. Shown are.

DETAILED DESCRIPTION OF THE PREFERRED EMBODIMENTS

FIGS. 1 to 4 relate to preferred exemplary embodiments of a mounting device 11 for the counterpressure-free mounting of a pressure plate assembly 1 to a counterpressure plate. Further, said figures relate to both a method for the counterforce-free mounting of the pressure plate assembly 1 to the counterpressure plate, as well as a method for the counterforce-free dismounting of the pressure plate assembly 1 from the counterpressure plate. Features and processing steps that are not marked as essential for the invention in the present description shall be considered optional.

Accordingly, the following description also relates to other exemplary embodiments of the mounting device 11 and/or the mounting and dismounting method, which show partial combinations of the features and processing steps explained in the following. Similarly, these features and processing steps can also be freely combined with the features and processing steps listed in the introduction to the description and/or the features and processing steps mentioned in the claims. The pressure plate assembly 1 is particularly embodied as a part of a friction clutch and provided for the drivetrain of a motor vehicle.

The pressure plate assembly 1 comprises a coupling lid 2. A pressure plate 6, displaceable in the axial direction A, is provided inside the coupling lid 2 in the radial direction R and in the axial direction A of the pressure plate assembly 1. The pressure plate 6 is supported in a torque-proof fashion in reference to the coupling lid 2, for example via spring washers 5 riveted to the pressure plate 6 and to the coupling lid 2.

Figure 1:
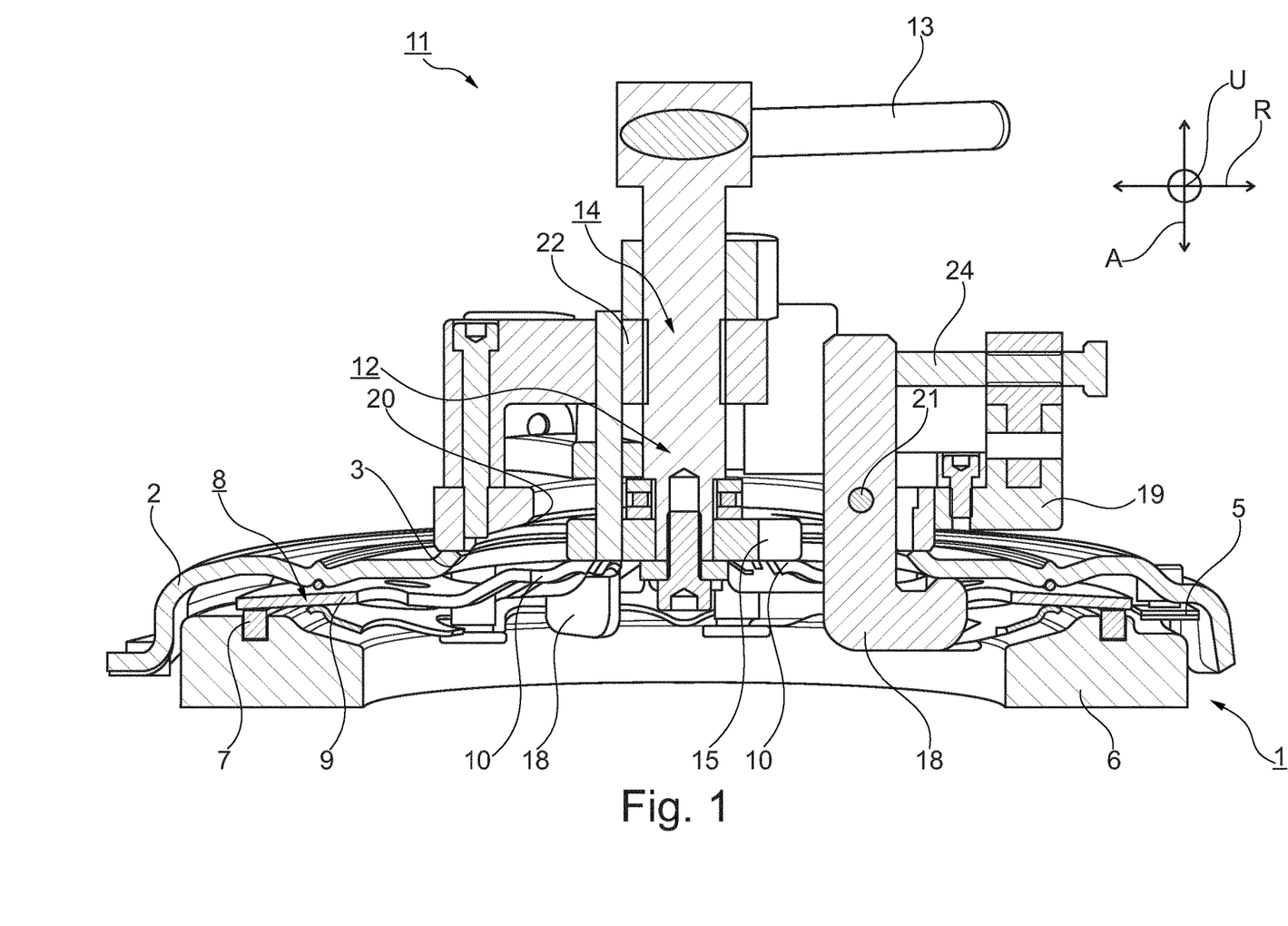
FIG. 1 a first exemplary embodiment of a mounting device, with the mounting device being fastened to a pressure plate assembly, in a cross-sectional illustration, FIG. 2 the mounting device and the pressure plate assembly of FIG. 1 in a plan view, FIG. 3 the mounting device and the pressure plate assembly of FIG. 1 in a perspective illustration, and FIG. 4 a second exemplary embodiment of a mounting device, with the mounting device being fastened to a pressure plate assembly, half of which is shown in a cross-sectional illustration.

A spring washer 9 is supported at the coupling lid 2 via a drag bearing 8. The drag bearing 8 may be embodied directly by the coupling lid 2, or as shown in FIG. 1, may for example be formed via a wire ring, an additional spring, and via spring washer—centering pins. The spring washer 9 comprises several spring washer tongues 10, spaced apart from each other in the circumferential direction U of the pressure plate assembly 1 and particularly evenly spaced. The spring washer tongues 10 are embodied in a radially interior section of the spring washer 9 and transfer in the radial exterior section of the spring washer 9 into a force-brim of the spring washer 9.

Using its force-brim the spring washer 9 acts upon the pressure plate 6 in order to displace the pressure plate 6 in the axial direction A when the spring washer 9 is tilted about the drag bearing 8, this means to engage and/or disengage the pressure plate assembly 1. The effect of the spring washer 9 upon the pressure plate 6 can occur directly, particularly when the pressure plate 6 is equipped with one or more pressure plate cams, spaced apart from each other in the circumferential direction U, which extend in the axial direction A, with the force-brim of the spring washer 9 contacting them. Instead of the pressure plate cams, as shown in FIG. 1, an adjustment ring 7 may be provided, which is allocated to a force-based or path-based attrition compensation device, and with its ramps resting on the counter ramps inserted in the pressure plate 6, capable to glide thereon. Via the adjustment ring 7 the force-brim of the spring washer 9 acts indirectly upon the pressure plate 6.

In order to complete the friction clutch, a counter pressure plate is missing and a clutch disk, both of which not being shown in FIG. 1. In the complete friction clutch the pressure plate assembly 1, more precisely the coupling lid 2, is connected fixed to the counter pressure plate, which is stationary in the axial direction A, particularly via a screw connection. For this purpose the coupling lid 2 shows in its exterior circumference several threaded holes 4, spaced apart from each other in the circumferential direction U.

The clutch disk is arranged in the axial direction A between the pressure plate 6 and the counter pressure plate. While the counter pressure plate, in reference to the transmission of the torque, forms the input side of the friction clutch, the clutch disk, which can be clamped in a friction-fitting fashion between the pressure plate 6, which is displaceable in the axial direction A to a limited extent, and the counter pressure plate, stationary in the axial direction A and forming the output side of the friction clutch.

The friction clutch or the pressure plate assembly 1 shown in FIG. 1 comprises a normally engaged pressure plate assembly 1 or is embodied as such. In the normally engaged pressure plate assembly 1 the effective force of the spring washers 9 is overwhelming in the idle state of the counter-force of the spring washers 5, while in a normally disengaged pressure plate assembly, not shown, the counterforce of the spring washers is overwhelming in reference to the acting force of the spring washers and/or the lever spring in the idle state. Accordingly, an activation of the spring washer 9 of the normally engaged pressure plate assembly 1 shown in FIG. 1 leads to the release of the pressure plate assembly 1 by tilting and/or switching the spring washer 9, which means to the pressure plate 6 being lifted off and to the removal of the pressure plate 6 from the counter pressure plate, resulting in a release of the friction-fitting connection with the clutch disk. Unlike this situation, an activation of the spring washer and/or the lever spring leads in a normally disengaged pressure plate assembly, not shown, to the pressure plate assembly being engaged by the spring washer and/or lever spring being tipped.

The pressure plate assembly 1 shown in FIG. 1 is embodied as a normally engaged, compressed pressure plate assembly 1. When the pressure plate assembly 1 and/or the respective friction clutch is installed in the drivetrain of a motor vehicle, a release device is provided in the proximity of the central opening 3, provided in the clutch disk 2, which applies a pressing force upon the spring washer tongues 10 in order to operate the friction clutch, which means releasing the pressure plate assembly 1.

Inversely, the pressure plate assembly 1, by displacing the drag bearing 8 at the radially exterior edge of the force-brim of the spring washer 9 and by displacing the direct or indirect contact of the force-brim of the spring washer 9 at the pressure plate 9 inwardly in the radial direction R, can be embodied as a normally engaged, pressure plate assembly 1 subjected to tensile stress. Here, during operation the respective friction clutch applies tensile force acting upon the spring washer tongues 10 in the releasing direction for releasing the pressure plate assembly 1. Both embodiments of the pressure plate assembly 1 can be mounted and/or dismounted by the mounting device 11 described in the following.

Figure 2:
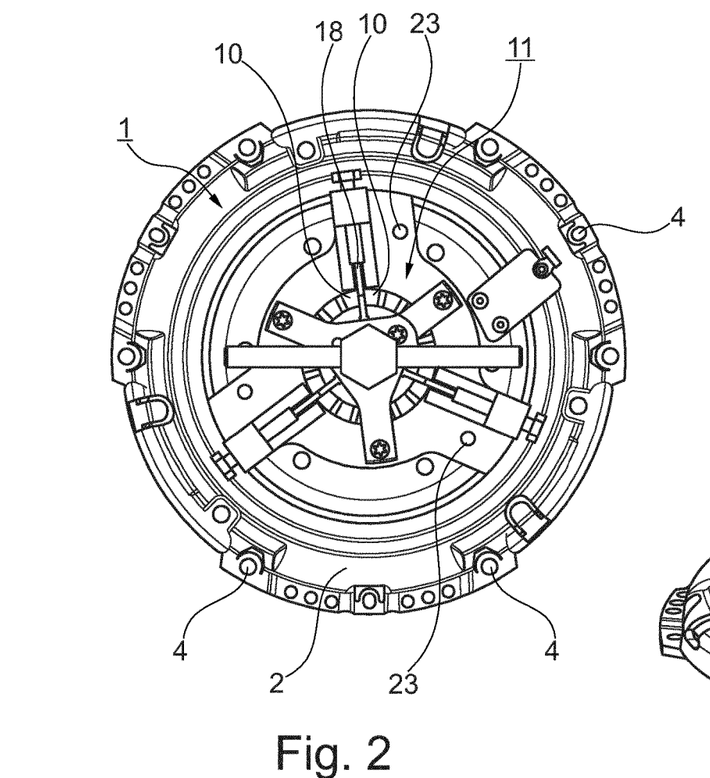
Figure 3:
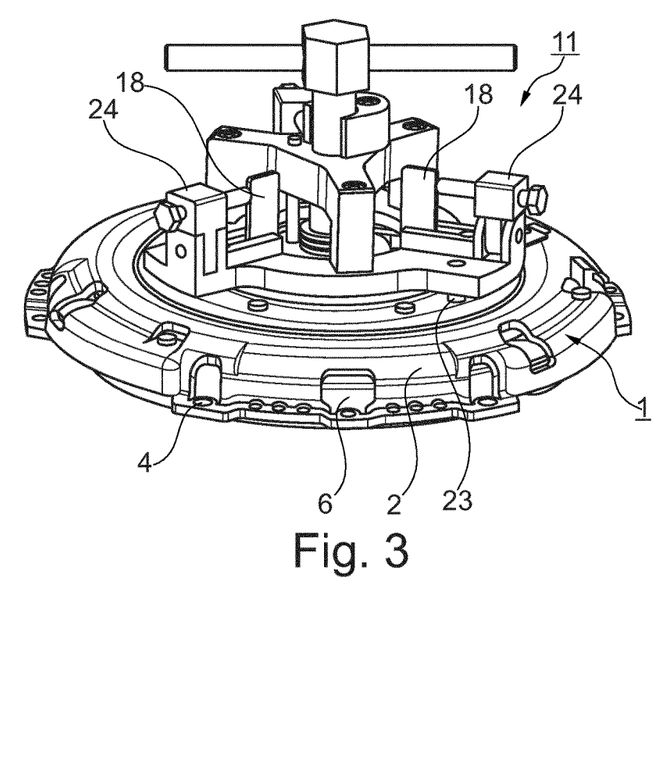

The mounting device 11 shown in FIGS. 1 to 3 is placed in the proximity of the central opening 3 of the coupling lid 2 onto said coupling lid 2, this means in the area in which, when the pressure plate assembly 1 and/or the friction clutch is assembled in the drivetrain of the motor vehicle, the release device is provided. In the drivetrain, commonly relates to the transmission side, with reference to FIG. 1 the upper section of FIG. 1. The mounting device 11 is embodied for a counterpressure-free mounting of the pressure plate assembly 1 at the counterpressure plate.

The mounting device 11 comprises a base element 19, which is embodied to contact the coupling lid 2 outside the pressure plate assembly 1, with reference to FIG. 1 coming from the transmission side. The base element 19 is essentially embodied in an annular fashion, and comprises a central opening 20, which is aligned coaxially in reference to the central opening 3 of the coupling lid 2 and with its diameter essentially being equivalent to the diameter of the central opening 3 of the coupling lid 2.

Furthermore, the mounting device 11 has several hook elements 18, which are embodied to engage the coupling lid 2 of the pressure plate assembly 1 from behind in order to hold stationary the mounting device 11 in reference to the pressure plate assembly 1, at least in the axial direction A. In particular, the hook elements 18 are embodied in combination with the base element 19 to hold the mounting device 11 on the clutch disk 2, fixed in the axial direction A.

In the exemplary embodiment shown, a total of three hook elements 18 are provided, which are arranged evenly distanced from each other in the circumferential direction U of the mounting device 11 and which are embodied to engaged the coupling lid 2 from behind, coming from the central opening 3 of the coupling lid 2. For this purpose, the hook elements 18 are essentially embodied in the form of an L and/or J, and supported on the base element 19 of the mounting device 11 in the proximity of the central opening 20 of the base element 19 on rotational axles 21, which are aligned essentially tangentially in reference to the central opening 20. Thus, the hook elements 18 are supported in the proximity of the central opening 20 in a tippable fashion at the base element 19, in order to engage the coupling lid 2 from behind, coming from the central opening 3 of the coupling lid 2.

Preferably the hook elements 18 are each embodied to penetrate between two spring washer tongues 10 of the pressure plate assembly 1, adjacent in the circumferential direction U and to engage the clutch lid 2 from behind. For this purpose, the hook elements 18 show a thickness in the circumferential direction U of the mounting device 11, which is smaller than the distance between the two adjacent spring washer tongues 10 measured in the circumferential direction 4 of the pressure plate assembly 1. Due to the fact that the number of spring washer tongues 10 may vary in different pressure plate assemblies 1, it is additionally advantageous for the hook elements 18 to show a certain ability for displacement along its axes of rotation 21 extending tangentially in reference to their central opening 20, in order to allow a displacement in case of different numbers of spring washer tongues 10 such that they respectively penetrate the pressure plate assembly 1 between two adjacent spring washer tongues 10 and can engage the coupling lid 2 from behind.

Although it is not shown in the figures, it is also possible that the distance between the spring washer 9 and/or the spring washer tongues 10 and the coupling lid 2 is of such a size in the axial direction A of the pressure spring assembly 1 that the hook elements 18 can engage the coupling lid 2 from behind, coming from the central opening 3 of the coupling lid 2, without here penetrating between two adjacent spring washer tongues 10. This option is given, however in light of the strict requirements for construction space and the attempts to reduce the axial construction space of modern pressure plate assemblies 1 it may be considered rather improbable.

As an alternative to the exemplary embodiment shown in the figures it is also possible to implement the hook element or elements 18 as a part of a bayonet lock, while the second part of the bayonet lock is embodied in the coupling lid 2, particularly at the edge of the central opening 3 of the coupling lid 2. This way the assembly device 11 and the pressure plate assembly 1 for a bayonet connection, while the hook element or elements 18, which form(s) the first part of the bayonet lock, are preferably located in the proximity of the central opening 20 of the base element 19, rotationally supported on the base element 19 in the circumferential direction, so that they are able to penetrate the pressure plate assembly 1, when rotated in the circumferential direction U, and engage the coupling lid 2 from behind.

The exemplary embodiment of the mounting device 11 shown further comprises a clamping device 24 and/or several clamping devices 24, which are provided at the base element 19 and embodied to act upon the hook elements 18 in order to prevent the hook elements 18 from popping out. For example, the clamping elements 24 are embodied as bolts, which in the radial direction R can be screwed into the mounting device 11, which act upon the free ends of the essentially L and/or J-shaped hook elements 18, arranged outside the pressure plate assembly 1, in order during the use of the mounting device 11 for preventing the hook elements 18 from tipping about the axis of rotation 21, and to generate sufficient force between the ends of the hook elements 18, arranged between the pressure plate assembly 1, and the support area of the base element 19 on the coupling lid 2, so that the mounting device 11 can be held on the coupling lid 2 in a sufficiently tight fashion. However other forms of clamping devices 24 are also possible, for example the form of a tensile ring, with its diameter being subject to reduction by a tensile screw, and with its free end encompassing the essentially L and/or J-shaped hook elements 18. Form-fitting clamping devices 24 are also possible.

Further, the mounting device 11, particularly the base element 19 of the mounting device 11, show one or more rotary locks 23, which can be made to engage the coupling lid 2 in order to prevent any rotation of the mounting device 11 in the circumferential direction U of the pressure plate assembly 1. These rotary locks 23 may for example be embodied as one or more bolts that can be screwed into the mounting device 11 and/or the pressure plate assembly 1 in the axial direction A, which bolts can engage appropriate openings of the coupling lid 2, however for example fixed axial protrusions may also be embodied at the base element 19. In order to form a rotary lock 23 it is sufficient for one of the bolts (or an axial protrusion) to engage an opening at the side of the coupling lid.

It is particularly advantageous for the assembly device 11 when in this context the rotary symmetry of the mounting device 11 is consistent with the rotary symmetry of the pressure plate assembly 1, particularly the rotary symmetry of the spring washer 9, because this way it is ensured that the rotary locks 23 engage the coupling lid 2, and the hook elements 18 are also positioned such that they can penetrate the pressure plate assembly 1, respectively between two adjacent spring washer tongues 10.

When the uniform rotary symmetry is not given, under certain circumstances only one rotary position is given, in which the rotary lock 23 engages the coupling lid 2 and in which the hook elements 18 can each engage the pressure plate assembly 1 between two adjacent spring washer tongues 10. In this case it is particularly advantageous for the hook elements 18 to show, along their axis of rotation 21, certain abilities for displacement in the tangential direction in reference to the central opening 20 of the base element 19.

In the exemplary embodiment shown, a spindle holder 22 is fastened on the base element 19. However, the spindle holder 22 may also be embodied in one piece with the base element 19. A spindle unit 14 is supported in a rotational fashion in the spindle holder 22, with a rotation of the spindle unit 14 in the circumferential direction U of the mounting device 11 being converted into an axial motion.

In order to rotate the spindle unit 14, particularly a hand wheel 13 is provided, which is connected to the spindle unit 14 in a torque-proof fashion at the freely accessible end of the spindle unit 14. Instead of the hand wheel 13, for example a crank may also be provided to drive the spindle unit 14. It is also possible to provide a tool accept in order to allow rotating the spindle unit 14, for example using a wrench or a ratchet. Additionally, it is possible to use an electromotive drive. Instead of the spindle unit 14, for example a hydraulic slave cylinder may be provided, generating the axial motion via hydraulic pressure.

A release element 12 is fastened at the spindle unit 14 so that the release element 12 can be displaced in the axial direction A by the spindle unit 14 and when the spindle 14 is being driven it is embodied to impinge the spring washer tongues 10 of the pressure plate assembly 1 with an axial force in order to disengage the normally disengaged pressure plate assembly 1. Thus, the release element 12 is arranged in a displaceable fashion in the axial direction A of the mounting device 11. In the exemplary embodiment shown the release element 12 shall be considered a component of the spindle unit 14 and in this context it may be formed in one piece with said spindle unit 14 or formed as a separate part at the end of the spindle unit 14 which during operation of the mounting device 11 is not freely accessible.

In the exemplary embodiment shown the release element 12 shows in its end section, i.e. in the end of the spindle unit 14, which during operation of the mounting device 11 is not freely accessible, a pressure element 15, which is embodied to contact the spring washer tongues 10, coming from the coupling lid 2, in order to release the normally engaged, compressed pressure plate assembly 1 upon rotation of the spindle unit 14. Here, the pressure element 15 applies an axial force upon the spring washer tongues 10, aligned downwards with regards to FIG. 1, this means into the pressure plate assembly 1. For this purpose, the pressure element 15 is embodied as a disk-shaped element, in particular.

However it is also possible that, instead of the pressure element 15, the release element 12 shows a tensile element at its end section, which is embodied in a hook-shaped fashion to engage the spring washer tongues 10 from behind, coming from the pressure plate of the pressure plate assembly 1, in order to disengage the normally engaged pressure plate assembly 1 subjected to tensile stress, not shown. When placing the mounting device 11 upon the pressure plate assembly 1 the hook-shaped tensile element shall be aligned such that its hook sections can penetrate the pressure plate assembly 1 between adjacent spring washer tongues 10. Then the hook-shaped tensile element is rotated in reference to the base element 19 in the circumferential direction U of the mounting device 11 and/or the pressure plate assembly 1 in order to engage the spring washer tongues 10 from behind and in order to contact the spring washer tongues 10, coming from the pressure plate 6. Using a suitable fixing device, the alignment of the hook-shaped tensile element shall be upheld in reference to the base element 19 even when the spindle unit 14 is rotated, because otherwise, particularly when the tensile element is not yet contacting the spring washer tongues 10, it is possible for the tensile element to pop out from two adjacent spring washer tongues.

It is advantageous when the pressure element 15 for the mounting device 11 can be replaced by the tensile element and vice versa, in order to allow a range of applications of the mounting device 11 as wide as possible. It is also advantageous for the pressure element 15 and the tensile element to be embodied as a single release element 12 for both cases of applications, so that an exchange for specific applications can be waived in case of compressed or stressed pressure plate assemblies.

Figure 4:
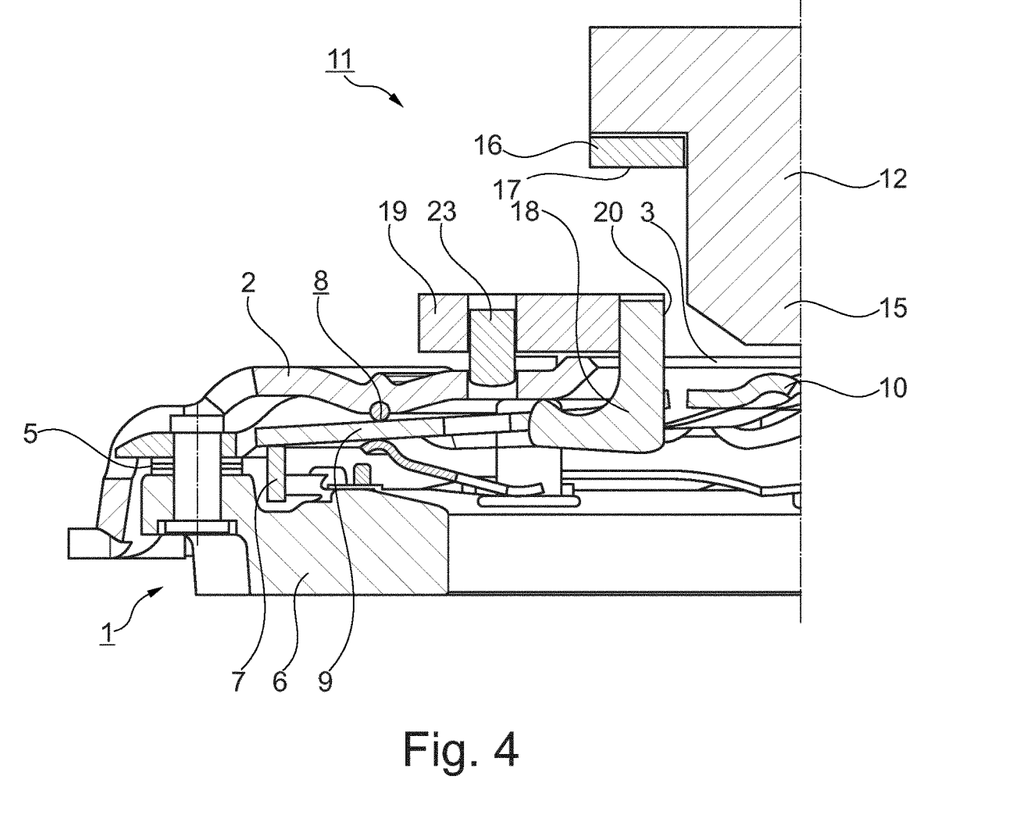

Unlike the previous exemplary embodiments, FIG. 4 shows an exemplary embodiment in which the release element 12 is provided with a stop 17 in the axial direction A of the mounting device 11 and/or the pressure plate assembly 1, which can be changed by adding or removing one or more spacers 16. When the release element 12 is moved in the axial direction A, the stop 17 preferably comes into contact with a respective section of the base element 19 in order to limit the axial motion of the release element 12.

The stop 17 is particularly advantageous in order to prevent any excess pressures, perhaps also an overstressing of the spring washer tongues 10 when the mounting device 11 is in use. This is particularly advantageous when the pressure plate assembly 1 shows an attrition compensation device, particularly a path-based attrition compensation device, because by the overpressure and/or overstressing of the spring washer tongues 10 the drive link of the path-based attrition compensation device may become damaged.

Although in the description of the previous exemplary embodiments the mounting device 11 is called and described as a mounting device, the selection of terminology also includes the dismounting. Thus, the mounting device 11 simultaneously represents a device, which is suitable for a counterforce-free dismounting of the pressure plate assembly 1 from the counterpressure plate of the friction clutch.

The previous exemplary embodiments relate to a mounting device 11 for the counterforce-free mounting of a pressure plate assembly 1 to a counterpressure plate with at least one release element 12, which can be displaced in the axial direction A in reference to the pressure plate assembly 1, which is embodied to impinge the spring washer tongues 10 of the pressure plate assembly 1 with an axial force in order to disengage the normally engaged pressure plate assembly 1 and with at least one hook element 18, which is embodied to engage a coupling lid 2 of the pressure plate assembly 1 from behind, in order to hold the mounting device 11 in a stationary fashion in the axial direction A, at least in reference to the pressure plate assembly 1, when the release element 12 impinges the spring washer tongues 10 of the pressure plate assembly 1 with an axial force.

Furthermore, the previous exemplary embodiments relate to a method for a counterpressure-free mounting of a pressure plate assembly 1 to a counterpressure plate via a mounting device 11 according to at least one of the previous exemplary embodiments, with the mounting device 11 being placed via its base element 19 onto a top side of the coupling lid 2 of the pressure plate assembly 1, particularly at the transmission side, or the hook element or elements 18 is/are rotated and/or tipped in order to engage from behind a rear side of the coupling lid 2, particularly at the side of the pressure plate, so that the mounting device 11 rests on the coupling lid 2 fixed in the axial direction A, the release element 12 is displaced in the axial direction A in reference to the pressure plate assembly 1, in order to impinge the spring washer tongues 10 with an axial force and to disengage the normally engaged pressure plate assembly 1, and the pressure plate assembly 1 is connected fixed to the counterpressure plate, particularly screw-connected in the area of the threaded holes 4.

Further, the previous exemplary embodiments show a method for the counterpressure-free dismounting of a pressure plate assembly 1 from a counterpressure plate via a mounting device 11 according to at least one of the previous exemplary embodiments, with the mounting device 11 being placed via its base element 19 on a top side of the coupling lid 2 of the pressure plate assembly 1, particularly at the transmission side, the hook element or elements 18 is/are rotated and/or tipped in order to engage from behind the rear of the coupling lid 2, particularly at the side of the pressure plate, so that the mounting device 11 is placed fixed in the axial direction A on the coupling lid 2, the release element 12 is displaced in the axial direction A in reference to the pressure plate assembly 1, in order to impinge the spring washer tongues 10 with an axial force and to disengage the normally engaged pressure plate assembly 1 in order to release the pressure plate assembly 1 from the counterpressure plate, particularly by loosening the screw-connection in the area of the threaded holes 4.

LIST OF REFERENCE CHARACTERS

1 Pressure plate assembly
2 Coupling lid
3 Central opening
4 Threaded hole
5 Spring washer
6 Pressure plate
7 Adjustment ring 8 Drag bearing
9 Spring washer
10 Spring washer tongue
11 Mounting device
12 Release element
13 Hand wheel
14 Spindle unit
15 Pressure element
16 Spacer
17 Stop
18 Hook element
19 Base element
20 Central opening
21 Axis of rotation
22 Spindle holder
23 Rotary lock
24 Clamping device
A Axial direction
R Radial direction
U Circumferential direction

The invention claimed is:

1. A mounting assembly for a counterforce-free mounting of a pressure plate assembly to a counterpressure plate, the mounting assembly comprising
a pressure plate assembly having:
a spring washer having a plurality of spaced apart tongues; and
a mounting device having:
at least one release element, which is displaceable in an axial direction (A) at least in reference to the pressure plate assembly, embodied to impinge the spring washer tongues with an axial force in order to disengage a normally engaged state of the pressure plate assembly,
at least one hook element embodied to engage behind a coupling lid of the pressure plate assembly in order to hold the mounting device fixed at least in the axial direction (A) in reference to the pressure plate assembly when the at least one release element impinges the spring washer tongues with the axial force, and
a base element embodied to contact the coupling lid and arranged on the release element in a displaceable fashion in the axial direction (A) of the mounting device,
wherein the hook element penetrates between two adjacent spring washer tongues into the pressure plate assembly to engage the coupling lid from behind.

2. The mounting assembly according to claim 1, further comprising several of the hook elements arranged at a distance from each other, and the hook elements are embodied to engage from behind the coupling lid, coming from a central opening of the coupling lid.

3. The mounting assembly of claim 2, wherein the hook elements are evenly spaced in a circumferential direction of the mounting device.

4. The mounting assembly according to claim 1, wherein the base element is embodied to contact the coupling lid from outside the pressure plate assembly.

5. The mounting assembly according to claim 4, wherein the base element and the at least one hook element are embodied to hold the mounting device on the coupling lid, fixed in the axial direction (A).

6. The mounting assembly according to claim 4, wherein the base element comprises a central opening, having a diameter that is essentially equivalent to a diameter of a central opening of the coupling lid, and the hook element rests on the base element arranged in proximity to the central opening of the base element in at least one of a tippable or in a circumferential direction (U) rotational fashion, in order to engage the coupling lid from behind.

7. The mounting assembly according to claim 1, wherein the release element comprises in an end section thereof a pressure element, which is embodied to contact the spring washer tongues, coming from the coupling lid, in order to release an engaged, compressed state of the pressure plate assembly.

8. The mounting assembly according to claim 1, further comprising at least one rotary lock, which is made to engage an opening of the coupling lid in order to prevent any rotation of the mounting device in a circumferential direction (U).

9. The mounting assembly of claim 8, wherein the base element includes the at least one rotary lock.

10. The mounting assembly according to claim 1, further comprising at least one clamping device which acts upon the hook element in order to prevent the at least hook element from popping out during a release process.

11. The mounting assembly of claim 10, wherein the base element includes the at least one clamping device.

12. A method for the counterforce-free mounting of a pressure plate assembly to a counterpressure plate via the mounting assembly according to claim 1, comprising
placing the mounting device, via the base element, on top of the coupling lid of the pressure plate assembly, at least one of rotating or tilting the hook element or elements in order to engage the coupling lid from behind so that the mounting device sits on the coupling lid, fixed in the axial direction (A),
displacing the release element in the axial direction (A) in reference to the pressure plate assembly in order to impinge the spring washer tongues with an axial force and release the normally engaged state of the pressure plate assembly, and
connecting the pressure plate assembly to the counterpressure plate in a fixed manner.

13. A method for a counterforce-free dismounting of a pressure plate assembly from a counterpressure plate via the mounting assembly according to claim 1, comprising
placing the mounting device, via the base element, on a top side of the coupling lid of the pressure plate assembly, at least one of rotating or tipping the hook element or elements in order to engage a rear of the coupling lid from behind, so that the mounting device rests on the coupling lid, fixed in the axial direction (A),
displacing the release element in the axial direction (A) in reference to the pressure plate assembly in order to impinge the spring washer tongues with an axial force and to release the normally engaged state of pressure plate assembly, and
releasing the pressure plate assembly from the counterpressure plate.

* * * * *